US010984785B2

(12) United States Patent
Koo et al.

(10) Patent No.: US 10,984,785 B2
(45) Date of Patent: Apr. 20, 2021

(54) VOICE CONVERSATION METHOD AND SYSTEM WITH ENHANCED WORD FEATURES

(71) Applicant: SOGANG UNIVERSITY RESEARCH FOUNDATION, Seoul (KR)

(72) Inventors: Myoung-Wan Koo, Seoul (KR); Byoungjae Kim, Seoul (KR); Jung Yun Seo, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 152 days.

(21) Appl. No.: 16/447,373

(22) Filed: Jun. 20, 2019

(65) Prior Publication Data
US 2019/0392824 A1    Dec. 26, 2019

(30) Foreign Application Priority Data

Jun. 22, 2018  (KR) ......................... 10-2018-0072234

(51) Int. Cl.
*G10L 15/16* (2006.01)
*G10L 15/197* (2013.01)
(Continued)

(52) U.S. Cl.
CPC ........ *G10L 15/197* (2013.01); *G06F 16/3347* (2019.01); *G06N 3/0445* (2013.01);
(Continued)

(58) Field of Classification Search
CPC ....... G10L 15/197; G10L 15/16; G10L 15/22; G10L 15/30; G10L 2015/223;
(Continued)

(56) References Cited

U.S. PATENT DOCUMENTS

2018/0181648 A1* 6/2018 Chen .................. G06F 16/338
2018/0336183 A1* 11/2018 Lee .................... G06F 40/30
(Continued)

FOREIGN PATENT DOCUMENTS

KR    20150041908    4/2015
KR    20160060247    5/2016
(Continued)

OTHER PUBLICATIONS

Jo, et al., Konvbot: Korean Dialogue Model—Focusing on Morning and Home Environment, Winter Conference Proceedings, 2016, pp. 624-626.
(Continued)

*Primary Examiner* — Charlotte M Baker
(74) *Attorney, Agent, or Firm* — Cantor Colburn LLP

(57) ABSTRACT

Provided is a voice conversation method using a bi-directional LSTM (Bi-LSTM) memory network. The voice conversation method includes steps of: performing bi-directional LSTM processing on history sentences to generate first sentence embedding and second sentence embedding; performing bi-directional LSTM processing on a question sentence to generate question sentence embedding; inputting the first sentence embedding and the question sentence embedding to an input memory of a memory network and inputting the second sentence embedding into an output memory of the memory network; generating a weight matrix representing relevance between the first sentence embedding of the input memory and the question sentence embedding, performing weighted sum of the weight matrix and the second sentence embedding of the output memory to generate output information, adding the output information and the question sentence embedding to obtain prediction information, and outputting the prediction information; and
(Continued)

selecting an answer sentence by using the prediction information.

9 Claims, 4 Drawing Sheets

(51) Int. Cl.
    *G10L 15/22*         (2006.01)
    *G06N 3/04*         (2006.01)
    *G06N 3/08*         (2006.01)
    *G06F 16/33*         (2019.01)
    *G10L 15/30*         (2013.01)

(52) U.S. Cl.
    CPC ................ *G06N 3/08* (2013.01); *G10L 15/16* (2013.01); *G10L 15/22* (2013.01); *G10L 15/30* (2013.01); *G10L 2015/223* (2013.01)

(58) Field of Classification Search
    CPC .......... G06N 3/0445; G06N 3/08; G06N 5/04; G06N 20/00; G06F 16/3347; G06F 16/3346; G06F 16/3329; G06F 40/30; G16H 10/60; G16H 50/20; G16H 50/70
    USPC ........................................................ 704/232
    See application file for complete search history.

(56) References Cited

U.S. PATENT DOCUMENTS

| | | | | |
|---|---|---|---|---|
| 2019/0180743 | A1* | 6/2019 | Yoshida | G10L 15/02 |
| 2019/0228070 | A1* | 7/2019 | Lu | G06F 16/00 |
| 2019/0279614 | A1* | 9/2019 | Ye | G10L 15/16 |

FOREIGN PATENT DOCUMENTS

| | | |
|---|---|---|
| KR | 20160114668 | 10/2016 |
| KR | 20170043955 | 4/2017 |
| KR | 20170096282 | 8/2017 |

OTHER PUBLICATIONS

Sukhbaatar, et al., End-To-End Memory Networks, Advances in Neural Information Proceeding Systems, 2015, pp. 1-9.

* cited by examiner

VOICE CONVERSATION METHOD AND SYSTEM WITH ENHANCED WORD FEATURES

BACKGROUND OF THE INVENTION

1. Field of the Invention

The present invention relates to a natural language processing technique, and more particularly, to a voice conversation system and method with enhanced word features, capable of generating appropriate answer sentences for a natural language question sentence by enhancing features of words constituting sentences with respect to sentences constituting a query response corpus and the question sentence.

2. Description of the Related Art

A natural language query response technique is a technique where, when a natural language question sentence is input from a user, answers matching user's question intention are searched for, one of the answers is selected, and the selected answer is returned to the user.

With the advent of the mobile age, this natural language query response technique has been reemphasized as a technology for overcoming hardware limitation of mobile devices, that is, display of search results on a small screen. For example, in the case of the iPhone, a technology called 'Siri' has been proposed. The technology has presented that, when a user asks a question by voice, the Siri answers the question.

As such a technology, an end-to-end memory network is disclosed by Sainbayar Sukhbaatar, Arthur Szlam, Jason Weston, and Rob Fergus, "End-To-End Memory Networks" in Proceedings of the NIPS 2015 Symposium, Advances in Neural Information Processing Systems, in 2015. The end-to-end memory network is a model with excellent performance for query response problems. The end-to-end memory network is a program that finds an appropriate answer corresponding to a context when a context and a question are given. According to the program, the answer is a single word, and it is possible to derive an appropriate answer by extracting only the necessary information from even a context that includes unnecessary information.

However, only a relatively simple query response is possible, and the end-to-end memory network works well in a query response (the answer is configured with words). However, the above-described end-to-end memory network has a problem in that performance is greatly reduced for query sentences which have a large number of pieces of information and complicated contexts. That is, when the number of pieces of information presented is three, the error rate is 21.9 percent.

In addition, the above-mentioned end-to-end memory network has a problem in that the end-to-end memory network does not reflect the meaning of words well. For example, with respect to "four apples" and "six apples", "four" and "six" cannot be distinguished, but "four" and "six" are recognized as only numbers. Therefore, when fake information is added to the question "How many apples are there?", any correct answer cannot be obtained.

In addition, the end-to-end memory network does not cope with the proper nouns that are not included in the training data, and thus, there is a problem in that the end-to-end memory network does not cope with a question including the proper nouns not included in the training data.

SUMMARY OF THE INVENTION

The present invention is to provide a voice conversation system and method with enhanced word features, capable of generating appropriate answer sentences for a natural language question sentence by enhancing features of words constituting sentences with respect to sentences constituting a query response corpus and the question sentence.

The present invention is also to provide a voice conversation system and method with enhanced word features, capable of detecting an appropriate answer sentence for a question sentence including a proper noun not included in a query response corpus.

According to an aspect of the present invention, there is provided a voice conversation method with enhanced word features performed by a processor in a voice conversation system having a processor capable of data processing, a data input/output device, and a memory, the voice conversation method including steps of: (a) receiving, as an input, a query response corpus including history sentences, candidate answer sentences, and a question sentence; (b) generating a first word vector for the history sentences included in the query response corpus by using a first embedding vector and performing bi-directional LSTM processing on the first word vector to generate first sentence embedding for each history sentence; (c) generating a second word vector for each of the history sentences included in the query response corpus by using a second embedding vector and performing bi-directional LSTM processing on the second word vector to generate second sentence embedding for each history sentence; (d) generating a third word vector for the question sentence included in the query response corpus by using a third embedding vector and performing bi-directional LSTM processing on the third word vector to generate question sentence embedding; (e) inputting the first sentence embedding and the question sentence embedding into an input memory of a memory network and inputting the second sentence embedding into an output memory of the memory network; (f) generating a weight matrix representing relevance between the first sentence embedding of the input memory and the question sentence embedding, generating output information by performing weighted sum for the weight matrix and the second sentence embedding of the output memory, adding the output information and the question sentence embedding to obtain prediction information, and outputting the prediction information; and (g) predicting an answer sentence for the question sentence by using the prediction information and outputting the answer sentence.

Preferably, in the a voice conversation method with enhanced word features according to the above aspect, the step (a) further includes a step of performing pre-processing on sentences included in the input query response corpus to generate a word sequence including metadata converted from words, the first word vector is generated by multiplying each of the words constituting the word sequence for the history sentence by the first embedding vector in the step (b), the second word vector is generated by multiplying each of the words constituting the word sequence for the history sentence by the second embedding vector in the step (c), and the third word vector is generated by multiplying each of the words constituting the word sequence for the question sentence by the third embedding vector in the step (d).

More preferably, in the voice conversation method with enhanced word features according to the above aspect, a database representing the words included in the query response corpus by a metadata is input together with the query response corpus, and the metadata is configured with a data type and an identification number for each word constituting the sentences included in the query response corpus, in the step (a).

According to another aspect of the present invention, there is provided a non-transitory computer-readable memory storing instructions for executing operations by a processor for implementing a voice conversation method, the instructions for executing the voice conversation method executed on the processor cause the processor to execute steps of: (a) receiving, as an input, a query response corpus including history sentences, candidate answer sentences, and a question sentence; (b) generating a first word vector for the history sentences included in the query response corpus by using a first embedding vector and performing bi-directional LSTM processing on the first word vector to generate first sentence embedding for each history sentence; (c) generating a second word vector for each of the history sentences included in the query response corpus by using a second embedding vector and performing bi-directional LSTM processing on the second word vector to generate second sentence embedding for each history sentence; (d) generating a third word vector for the question sentence included in the query response corpus by using a third embedding vector and performing bi-directional LSTM processing on the third word vector to generate question sentence embedding; (e) inputting the first sentence embedding and the question sentence embedding into an input memory of a memory network and inputting the second sentence embedding into an output memory of the memory network; (f) generating a weight matrix representing relevance between the first sentence embedding of the input memory and the question sentence embedding, generating output information by performing weighted sum for the weight matrix and the second sentence embedding of the output memory, adding the output information and the question sentence embedding to obtain prediction information, and outputting the prediction information; and (g) predicting an answer sentence for the question sentence by using the prediction information and outputting the answer sentence.

According to the present invention described above, it is possible to obtain an effect of generating appropriate answer sentences for a natural language question sentence by enhancing features of words constituting sentences with respect to sentences constituting a query response corpus and the question sentence.

In addition, according to the present invention, it is possible to obtain an effect of detecting an appropriate answer sentence even for a question sentence including a proper noun not included in the query response corpus.

DETAILED DESCRIPTION OF THE PREFERRED EMBODIMENTS

The present invention enhances features of words constituting sentences which are history sentences, a question sentence, and candidate answer sentences included in a query response corpus to generate an appropriate answer sentence for a natural language question sentence. In addition, the present invention detects an appropriate answer sentence even for a question sentence including a proper noun not included in the query response corpus.

Hereinafter, a configuration and operations of a voice conversation system with enhanced word features according to the present invention will be described in detail with reference to the drawings.

<Configuration of Voice Conversation System with Enhanced Word Features>

Figure 1:
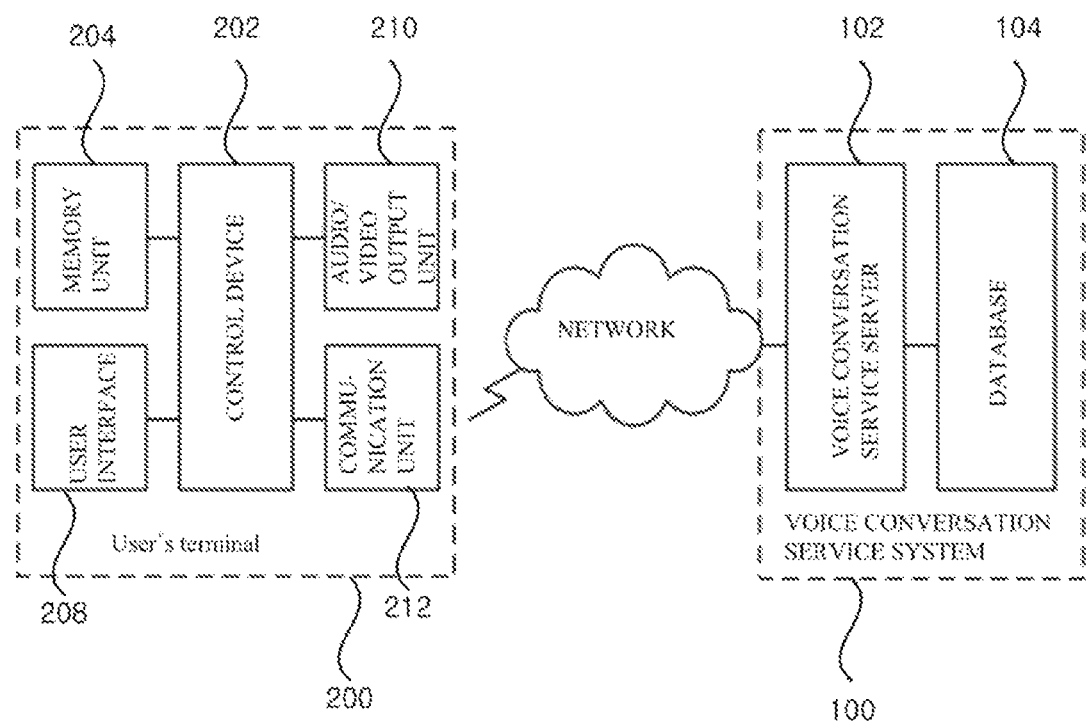
FIG. 1 is a structure diagram illustrating a voice conversation system using a bi-directional LSTM memory network according to a preferred embodiment of the present invention.

FIG. 1 is a structure schematic diagram illustrating a voice conversation system using a bi-directional LSTM memory network according to a preferred embodiment of the present invention. Referring to FIG. 1, a voice conversation service system 100 includes a voice conversation service server 102 and a database 104.

The voice conversation service server 102 provides a voice conversation service with enhanced word features to a user terminal 200 in accordance with the preferred embodiment of the present invention.

The database 104 stores various information required by the voice conversation service server 102.

In particular, the database 104 stores reference information for replacing words constituting each sentence with respect to the query response corpus configured with a plurality of history sentences and a question sentence, replaced-word information obtained by replacing words on the basis of the reference information, and original word information corresponding to the replaced-word information.

The user terminal 200 is connected to the voice conversation service system 100 via a network and provides a user with a voice conversation service with enhanced word features according to a preferred embodiment of the present invention. The user terminal 200 includes a control device 202 which controls each component of the user terminal 200 for the voice conversation service, a memory unit 204 which stores various information including a processing program of the control device 202, an audio/video output unit 210 which outputs audio and video under the control of the control device 202, and a communication unit 212 which performs communication between the control device 202 and the voice conversation service server 102.

In the preferred embodiment of the present invention described above, only the configuration where the voice conversation service system 100 provides a voice conversation service to the user through the user terminal 200 connected to the voice conversation service system 100 is disclosed. However, in the present invention, it is obvious to a person skilled in the art by the present invention that a program and a database for executing the voice conversation service can be implemented in the user terminal, and thus, the voice conversation service may be independently executed.

Now, a voice conversation service method with enhanced word features using a bi-directional LSTM memory network according to a preferred embodiment of the present invention will be described.

<Configuration of Voice Conversation Service Program with Enhanced Word Features>

Figure 2:
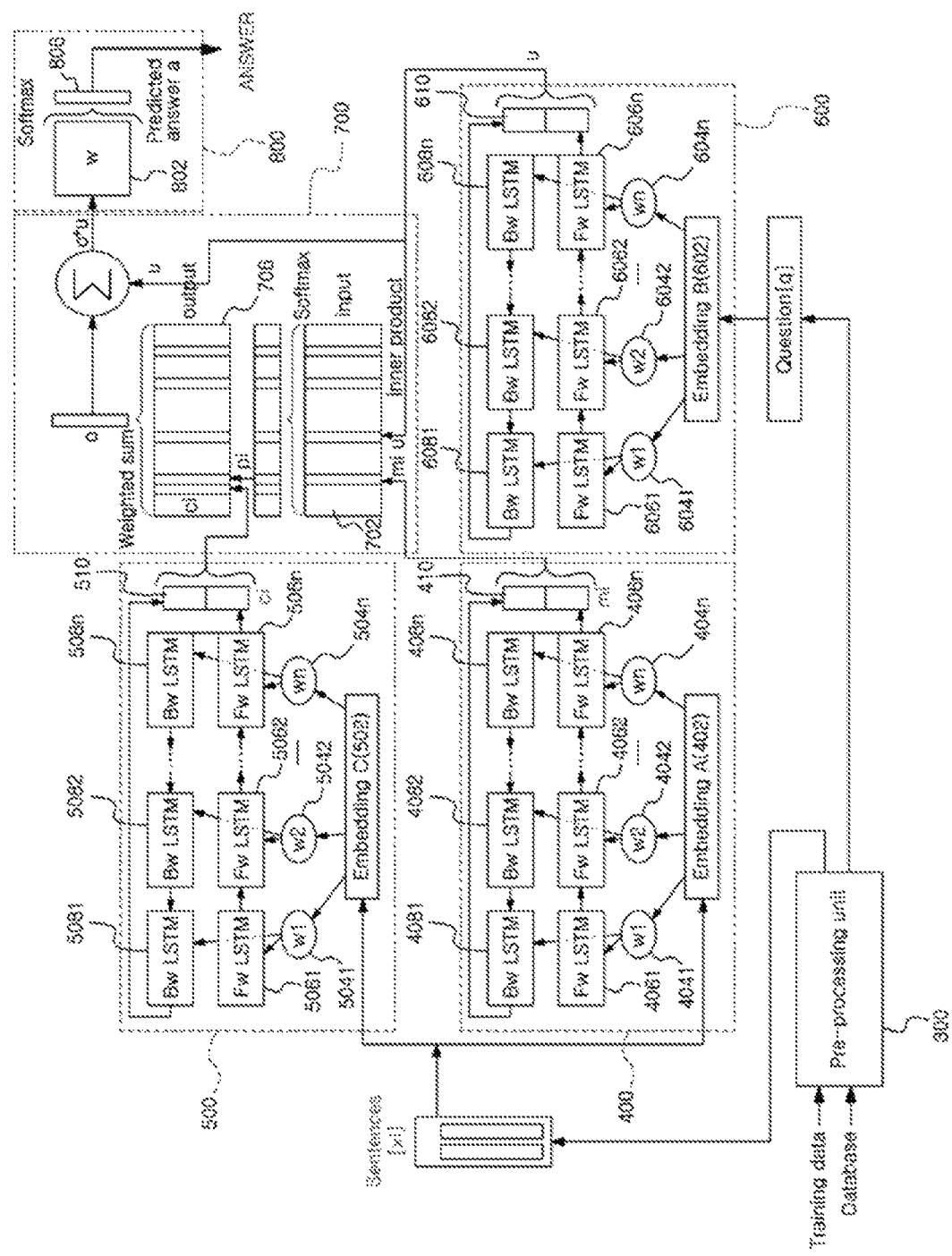
FIG. 2 is a schematic diagram illustrating a configuration of a voice conversation service performed by a voice conversation service server in the voice conversation system using the bi-directional LSTM memory network according to the present invention.

FIG. 2 is a schematic diagram illustrating a configuration of a voice conversation service performed by the voice conversation service server in the voice conversation system using a bi-directional LSTM memory network according to the present invention.

Referring to FIG. 2, the voice conversation service program includes a pre-processing unit 300, a first embedding processing unit 400, a second embedding processing unit 500, a third embedding processing unit 600, a network 700 and a correct answer output unit 800. The voice conversation service program receives the query response corpus 304 which is a training data and the database 104 for the query response corpus. The query response corpus includes a plurality of history sentences, a question sentence, and a plurality of candidate answer sentences. In addition, reference information and metadata for representing data types and identification information for words included in the query response corpus are recorded in the database.

As a corpus data used in this voice conversation service program, a query response corpus data relating to restaurant reservations provided by DSTC 6 Competition can be used. In the corpus data, the question is slightly more difficult than bAbI, and the answer is configured with sentences. In the present invention, a correct answer sentence is selected from among ten candidate answer sentences, and the selected correct answer sentence is output.

<Pre-Processing Unit 300>

The processing procedure of the pre-processing unit 300 according to the present invention will be described below with reference to FIG. 3.

Figure 3:
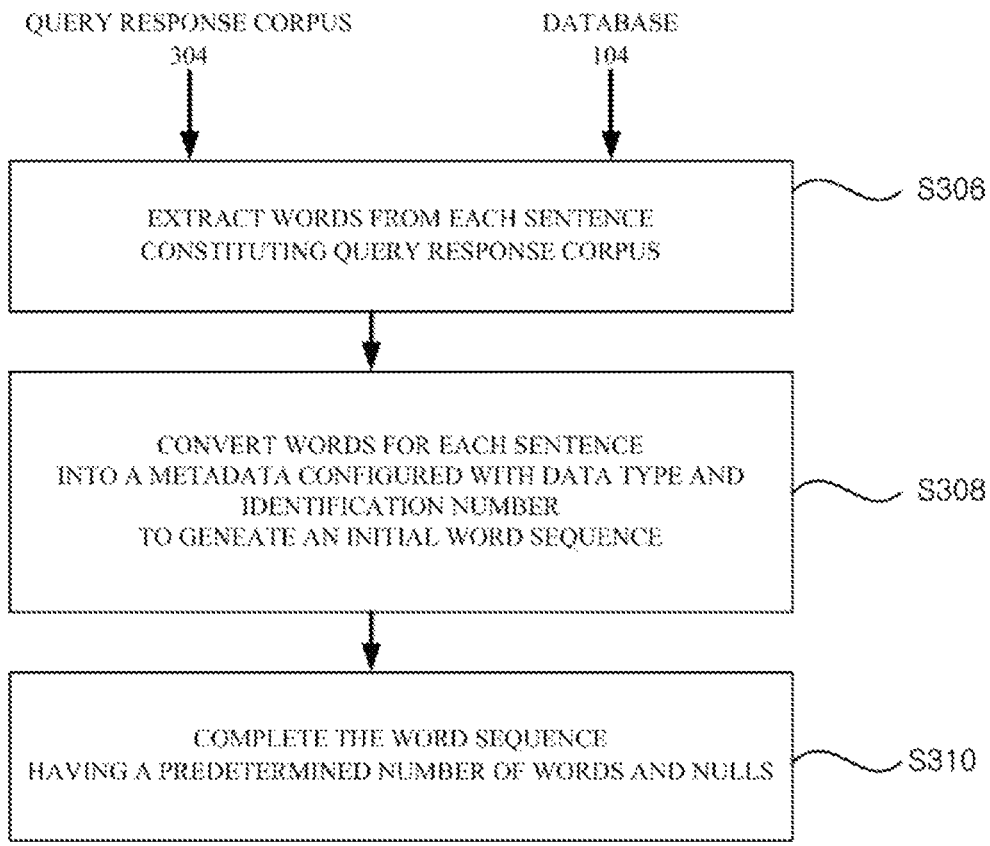
FIG. 3 is a flowchart sequentially illustrating operations of a pre-processing unit of the voice conversation service server in the voice conversation system using the bi-directional LSTM memory network according to the present invention.

FIG. 3 is a flowchart sequentially illustrating operations of the pre-processing unit of the voice conversation service server in the voice conversation system using the bi-directional LSTM memory network according to the present invention. Referring to FIG. 3, when a plurality of sentences included in the query response corpus 304 and a database 104 are input, the pre-processing unit 300 extracts words from a plurality of sentences constituting a query response corpus (step 306), converts each of the words into a metadata configured with the data type information and the identification number on the basis of the reference information of the database 104, and records the metadata and the original word information which are associated with each other in the database (step 308).

Figure 4:
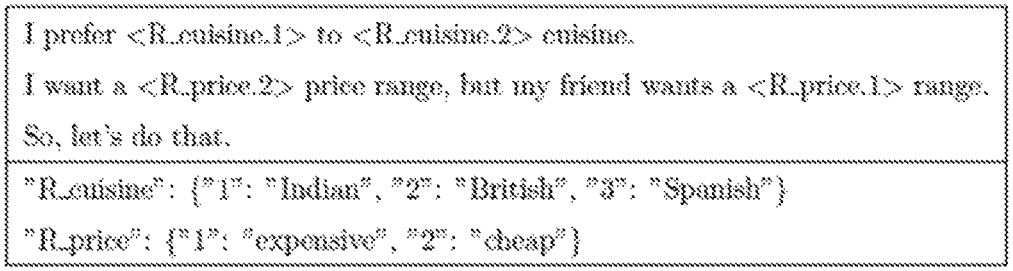
FIG. 4 is a diagram illustrating conversion of sentences into metadata types by the pre-processing unit using a database of the voice conversation service server in the voice conversation system using the bi-directional LSTM memory network according to the present invention.

FIG. 4 is a diagram illustrating conversion of the words for each sentences into metadata configured with a data type and identification number by the pre-processing unit using a database of the voice conversation service server in the voice conversation system using the bi-directional LSTM memory network according to the present invention.

The pre-processing unit 300 generates initial word sequences by combining the metadata for each of the words included in each of the sentences, respectively. If the number of words in the initial word sequence is smaller than a predetermined number, nulls are padded to the initial word sequence to complete the word sentence having the predetermined number of words and nulls, and the completed word sentence is output (step 310). Herein, nulls are replaced with the vector 0 after the embedding. It is preferable that the predetermined number of words and nulls included in a completed word sentence is determined by the number of words included in the longest sentence among the sentences of the query response corpus.

Thus, for each of the plurality of sentences, the pre-processing unit 300 converts the words constituting the sentence into the metadata configured with the data type and the identification number on the basis of the database and combines the metadata for the words of the sentence to generate the word sequence. At this time, if the number of words in the word sequence is smaller than the predetermined number, nulls are padded for a number of words shorter than the predetermined number to complete the word sequence.

The pre-processing unit 300 outputs the word sequences for the history sentences to the first and second embedding processing units 400 and 500 and outputs the word sentence for the question sentence to the third embedding processing unit 600.

<First Embedding Processing Unit 400>

The first embedding processing unit 400 includes an embedding matrix A unit 402, first forward LSTM units 4061 to 406n, first backward LSTM units 4081 to 408n, and a first LSTM cell addition unit 410.

When the word sentence for each of the history sentences included in the query response corpus is input from the pre-processing unit 300, the embedding matrix A unit 402 including a first embedding vector adds the first embedding vector to each of the words constituting the word sentence to generate first word vectors w1 to wn (4041 to 404n) and outputs the first word vectors w1 to wn (4041 to 404n) to the bi-directional LSTMs. The first forward LSTM units 4061 to 406n are configured with cells connected in the forward direction to generate first information where the first word vectors w1 to wn (4041 to 404n) are arranged in the forward direction according to the positions of the words. The first backward LSTM units 4081 to 408n are configured with cells connected in the backward direction to generate second information where the word vectors w1 to wn (4041 to 404n) are arranged in the backward direction according to the positions of the words. Herein, the number of cells included in the first forward LSTM units 4061 to 406n and the first backward LSTM units 4081 to 408n is determined to be a predetermined number at the time of generation of the word sequence. The predetermined number is determined so as to correspond to the number of words included in the longest sentence among the sentences included in the query response corpus.

The first LSTM cell addition unit 410 adds a hidden state vector to the last portion of the first forward LSTM units 4061 to 406n and adds a hidden state vector to the first portion of the first backward LSTM units 4081 to 408n to generate a first sentence embedding mi and outputs the first sentence embedding mi. Herein, the initial value of the hidden state vector is determined to zero.

In this manner, the first embedding processing unit 400 receives the word sequence for each of the history sentences included in the query response corpus, adds the first embedding vector to each of the words of the word sequence to generate the first word vectors w1 to wn 4041 to 404n, performs the bi-directional LSTM processing on the first word vectors w1 to wn (4041 to 404n), generates the first sentence embedding mi including the hidden state vector added to additional cells at both ends of the bi-directional LSTM, and outputs the first sentence embedding mi.

<Second Embedding Processing Unit 500>

The second embedding processing unit 500 includes an embedding matrix C unit 502, second forward LSTM units 5061 to 506n, second backward LSTM units 5081 to 508n, and a second LSTM cell addition unit 510.

When the word sequence for each of the history sentences included in the query response corpus is input from the pre-processing unit 300, the embedding matrix C unit 502 including a second embedding vector adds the second embedding vector to each of the words constituting the word sequence to generate word vectors w1 to wn (5041 to 504n) and outputs the word vectors. The second forward LSTM units 5061 to 506n are configured with cells connected in the forward direction to generate third information where the word vectors w1 to wn (5041 to 504n) are arranged in the forward direction according to the positions of the word. The second backward LSTM units 5081 to 508n are configured with cells connected in the backward direction to generate fourth information where the word vectors w1 to wn (5041 to 504n) are arranged in the backward direction according to the positions of the words. Herein, the number of cells included in the second forward LSTM units 5061 to 506n and the second backward LSTM units 5081 to 508n is determined so as to correspond to a predetermined number at the time of generation of the word sequence for a sentence.

The second LSTM cell addition unit 510 adds a hidden state vector to the last portion of the second forward LSTM units 5061 to 506n and adds a hidden state vector to the first portion of the second backward LSTM units 5081 to 508n to generate second sentence embedding ci and outputs the second sentence embedding ci. Herein, the vector value of the hidden state vector is determined to be zero.

In this manner, the second embedding processing unit 500 receives the word sequence for each of the sentences constituting the query response corpus, adds the second embedding vector to each of the words of the word sequence to generate the second word vectors w1 to wn (5041 to 504n), performs the bi-directional LSTM processing on the second word vectors w1 to wn (5041 to 504n), generates the second sentence embedding ci including the hidden state vectors added to additional cells at both ends of the bi-directional LSTM, and outputs the second sentence embedding ci.

<Third Embedding Processing Unit 600>

A third embedding processing unit 600 includes an embedding matrix B unit 602, third forward LSTM units 6061 to 606n, third backward LSTM units 6081 to 608n, and a third LSTM cell addition unit 610.

The embedding matrix B unit 602 includes a third embedding vector. When the word sequence for the question sentence included in the query response corpus is input from the pre-processing unit 300, the embedding matrix B unit 602 adds the third embedding vector to each of the words constituting the word sequence and outputs word vectors w1 to wn (6041 to 604n). The third forward LSTM units 6061 to 606n are configured with cells connected in the forward direction to generate fifth information where third word vectors w1 to wn (6041 to 604n) are arranged in the forward direction according to the positions of the words in the sentence. The third backward LSTM units 6081 to 608n are configured with cells connected in the backward direction to generate sixth information where the third word vectors w1 to wn (6041 to 604n) are arranged in the backward direction according to the positions of the words in the sentences. Herein, the number of cells constituting the third forward LSTM units 6061 to 606n and the third backward LSTM units 6081 to 608n is determined so as to correspond to a predetermined number at the time of generation of the word sequence.

The third LSTM cell addition unit 610 adds a hidden state vector to the last portion of the third forward LSTM units 6061 to 606n and adds a hidden state vector to the first portion of the third backward LSTM units 6081 to 608n to generate question sentence embedding u and outputs the question sentence embedding u. Herein, the vector value of the hidden state vector is determined to be zero.

In this manner, the third embedding processing unit 600 receives the word sequence for the question sentence, adds the third embedding vector to each of the words of the word sequence to generate the third word vectors w1 to wn (6041 to 604n), performs the bi-directional LSTM processing on the third word vectors w1 to wn (6041 to 604n) to generate the question sentence embedding u and outputs the question sentence embedding u.

The first to third embedding processing units 400, 500, and 600 apply the bi-directional LSTM to reflect the position information of the words in order to solve the problem that the meaning of the words is damaged, and add the hidden state vector to both ends of the bi-directional LSTM to represent the sentences with much larger vector dimensions and reflect the meaning of the preceding words and the following words in a balanced manner.

In particular, the bi-directional LSTM is applied to the sentence embedding and the question sentence embedding to be stored in the input memory and the output memory, and the words constituting the word sequence for the sentence are input to each cell of the bi-directional LSTM. Herein, one word is included in one cell, and each word is replaced with the embedding vector for the word. And, the embedding vector is input to the cell. The first, second, and third embedding vectors are initially randomly determined. The first, second, and third embedding vectors are tuned to the optimal values through the training procedure. The sentence embedding is configured in this manner, and thus, even though there are words that have the same numerical value in the sentence, different vector values are embedded, the meaning can be distinguished.

In addition, if the learning progresses through the bi-directional LSTM, because the vectors with the abbreviated information appear as the output of the LSTM, the word feature is enhanced. Among the above features, in particular, the position information of the words in the sentence is enhanced. This is because the temporal and positional information is reflected according to the characteristics of the LSTM. That is, the i-th sentence $x_i$ passes through the embedding matrix A unit 402 and the embedding matrix C unit 502, and the vectors matching the respective words are stored in the two matrices. By passing through these matrices, the words in the sentence are converted into vector values that match the respective words. The bi-directional LSTMs 406n, 408n, and 410 of the first embedding processing unit that generate mi to be input to the input memory 702 are input with the vector values passing through the embedding matrix A unit 402. In addition, the bi-directional LSTMs 5061 to 506n, 5081 to 508n, and 510 of the second embedding processing unit that generate ci to be provided to the output memory 706 are input with the vector values passing through the embedding matrix C unit 502. In addition, for the question sentence, u is generated in the same manner as described above through the embedding matrix B unit 602.

The embedding matrix A unit 402, the embedding matrix C unit 502, and the embedding matrix B unit 602 perform separate learning procedure. Therefore, the embedding matrix A unit 402 and the embedding matrix C unit 502 have different initial values defined randomly and have different values as the learning progresses. Accordingly, the hidden state values in the LSTMs of the first and second embedding processing units 400 and 500 are learned differently, and the values of mi and ci are different from each other.

The reason why the first and second embedding processing units 400 and 500 learn differently is that the input and output memories of the memory network have different uses. The input memory of the memory network is used to obtain the relevance between the history sentences and the question sentence. In the input memory, for the sentence having a higher relevance to the question sentence, the larger value of the weight softmax vector is allowed to be outputted. On the other hand, the output memory of the memory network is allowed to generate output information o where a portion having a relevance to the question sentence becomes conspicuous.

Finally, the embedding matrix B unit 302 performs learning while embedding the question sentence. In addition, the embedding matrix B unit 302 performs learning that is specialized in vectorization of the question sentence for a use which is different from the embedding used in the input and output memories 702 and 704 of the memory network.

<Memory Network 700>

The memory network 700 includes an input memory 702, an output memory 706, and a memory controller.

The first sentence embedding mi output by the first embedding processing unit 400 and the question sentence embedding u output by the third embedding processing unit 600 are input to the input memory 702. The memory controller performs the process according to Equation 1 by using the first sentence embedding mi and the question sentence embedding u that are input to the input memory to generate a weight matrix pi indicating the relevance between each of the history sentences and the question sentence, and outputs the weight matrix pi.

$$p_i = \text{Softmax}(u \cdot m_i)$$ [Equation 1]

$$\text{softmax} = \frac{e^{z_i}}{\sum_{k=1}^{K} e^{z_i}}$$

$$z_i = u \cdot m_i$$

In Equation 1, pi denotes a weight matrix (weighted vector) indicating the relevance between the first sentence embedding mi and the question sentence embedding u, i denotes identification information of the input sentence, k denotes a total number of elements input to a softmax function, "·" denotes matrix multiplication.

Herein, generally, if the embedding values are similar in natural language processing, it is determined that there is relevance, and the similarity is obtained by using cosine similarity. A simplified equation of the cosine similarity becomes an inner product. The values of the inner product of the first sentence embedding mi indicating the history sentence vectors and the question sentence embedding u represents the relevance therebetween.

The second sentence embedding ci output by the second embedding processing unit 500 is input to the output memory 706. The memory controller generates the output information o according to Equation 2 by using the second sentence embedding ci of the output memory and the weight matrix pi and outputs the output information o.

$$o = \sum_i p_i c_i$$ [Equation 2]

The output information o is a result of the weighted sum of the output ci of the second embedding processing unit 200 and the weight matrix pi indicating the relevance between the history sentences and the question sentence according to Equation 2. Therefore, the output information o is a result of selecting and outputting the appropriate sentence information among the history sentences so as to select the correct answer among the candidate answer sentences.

Next, the memory controller combines the output information o and the question sentence embedding u according to Equation 3 and outputs the combination result to the correct answer output unit 800 as a prediction information.

$$\text{Combination Result} = o + u$$ [Equation 3]

Because the output information o and the question sentence embedding u are vectors of the same dimension, the output information o and the question sentence embedding u can be added to each other in Equation 3.

<Correct Answer Output Unit 800>

The correct answer output unit 800 receives the prediction information o+u output from the memory network 700, multiplies a parameter matrix W 802 for model learning to the input prediction information, perform the softmax function process to predict the answer sentence.

Figure 5:
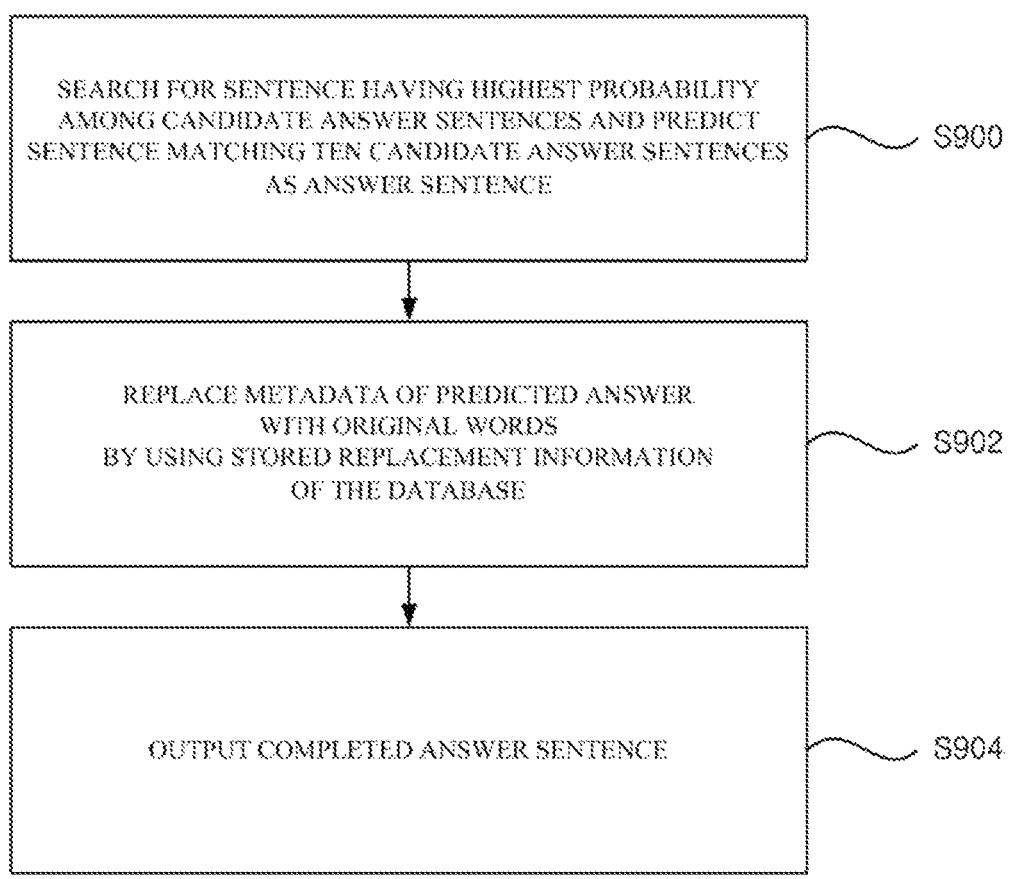
FIG. 5 is a flowchart sequentially illustrating operations of a correct answer output unit of the voice conversation processing unit of the voice conversation service server in the voice conversation system using the bi-directional LSTM memory network according to the present invention.

FIG. 5 is a flowchart sequentially illustrating operations of the correct answer output unit 800 of the voice conversation processing unit of the voice conversation service server in the voice conversation system by using the bi-directional LSTM memory network according to the present invention.

Referring to FIG. 5, in the correct answer output unit 800, the prediction information output from the memory network passes through the W layer 802 and the softmax layer according to Equation 4, so that a vector having the same dimension as the total number of candidate sentences is output. This output vector is a vector configured with probability that each candidate sentence is a correct answer. The sentences having the highest probability value are sequentially selected among the output vectors, and in a case where the selected sentence matches the sentence included in ten candidate correct answers (step 900).

$$a = \text{softmax}(W(o+u))$$ [Equation 4]

Since the dimension of "a" in Equation 4 is equal to the number of global candidates and is normalized by the softmax function, "a" represents a probability value for each candidate, and the total sum becomes 1.

When the answer sentence is predicted, the answer sentence is completed by replacing the metadata of the predicted answer sentence with the original words by using the words stored in the database 104 and the replacement information, and the answer sentence is output (steps 902 and 904).

In the present invention, in order to prepare for proper nouns which are less likely to appear in training data, converting words into metadata types with reference to the database and learning are performed. This approach is contrasted with the words registered in the database, and thus, performance can be improved. In addition, in the present invention, original types (for recovering changed words) are separately stored.

If learning is performed with proper nouns as is, the number of the word types increase very much, and if a word not learned in the test stage appears, the word is recognized as an unknown word, and thus, it becomes difficult to find the correct answer. In order to prevent such a situation, in the present invention, words corresponding to proper nouns and the like registered with reference to a given database are replaced with specific format. Herein, the types of words to be replaced include a restaurant name, a telephone number, a price, the number of persons, a type of food, a location of a restaurant, and the like.

Referring to FIG. 4, a replacement format is described. Like '<R_cuisine.1>', symbols '•' and numbers are given, and these are identification information for identifying these because there is a plurality of food-related words in one conversation. That is, the first food word is represented by '<R_cuisine.1>', and the second food word is represented by '<R_cuisine.2>'. In addition, in the present invention, in order to restore the words converted into the metadata configured with data type and identification number to the original type, the words are stored in the database in a dictionary format, so that it is possible to prevents the original sentence from be damaged in advance.

As described above, in the present invention, the words are converted with the metadata configured with predetermined types, and thus, the number of word types is reduced, so that smooth learning can be performed. If a new word exists in the database in the test stage, the type of the word can be known, so that an appropriate correct answer sentence can be found. As a result, the converted words are restored to the original words, and thus, the correct answer sentence can be output.

The replacement in the correct answer output unit according to the present invention is automatically performed through a Python code, and a replacement operation is performed on the input proper nouns existing in the database. Furthermore, since each conversation and each candidate sentence are given with unique identification information ID, even if the proper nouns are replaced, it is possible to find appropriate replacement information through the unique identification information ID. Then, the original sentence before the replacement can be restored by using the replacement information found through the unique identification information ID for the unique identification information ID and the answer sentence finally selected.

What is claimed is:

1. A voice conversation method with enhanced word features performed by a processor in a voice conversation system having a processor capable of data processing, a data input/output device, and a memory, the voice conversation method comprising steps of:
   (a) receiving, as an input, a query response corpus including history sentences, candidate answer sentences, and a question sentence;
   (b) generating a first word vector for the history sentences included in the query response corpus by using a first embedding vector and performing bi-directional LSTM processing on the first word vector to generate first sentence embedding for each history sentence;
   (c) generating a second word vector for each of the history sentences included in the query response corpus by using a second embedding vector and performing bi-directional LSTM processing on the second word vector to generate second sentence embedding for each history sentence;
   (d) generating a third word vector for the question sentence included in the query response corpus by using a third embedding vector and performing bi-directional LSTM processing on the third word vector to generate question sentence embedding;
   (e) inputting the first sentence embedding and the question sentence embedding into an input memory of a memory network and inputting the second sentence embedding into an output memory of the memory network;
   (f) generating a weight matrix representing relevance between the first sentence embedding of the input memory and the question sentence embedding, generating output information by performing weighted sum for the weight matrix and the second sentence embedding of the output memory, adding the output information and the question sentence embedding to obtain prediction information, and outputting the prediction information; and
   (g) predicting an answer sentence for the question sentence by using the prediction information and outputting the answer sentence.

2. The voice conversation method according to claim 1, wherein the step (a) includes a step of: performing pre-processing on sentences included in the input query response corpus to generate a word sequence including metadata converted from words,
   wherein, in the step (b), the first word vector is generated by multiplying each of the words constituting the word sequence for the history sentence by the first embedding vector,
   wherein, in the step (c), the second word vector is generated by multiplying each of the words constituting the word sequence for the history sentence by the second embedding vector, and
   wherein, in the step (d), the third word vector is generated by multiplying each of the words constituting the word sequence for the question sentence by the third embedding vector.

3. The voice conversation method according to claim 2, wherein, in the step (a), a database representing the words included in the query response corpus by a metadata is input together with the query response corpus,
   wherein the metadata is configured with a data type and an identification number for each word constituting the sentences included in the query response corpus.

4. The voice conversation method according to claim 1, wherein a weight matrix pi indicating relevance between the first sentence embedding for each of the history sentences and the question sentence embedding is calculated by processing a softmax function for an inner product of the first sentence embedding and the question sentence embedding according to Equation 5, $$p_i = Softmax(u \cdot m_i)$$ [Equation 5]

$$softmax = \frac{e^{z_i}}{\sum_{k=1}^{K} e^{z_i}}$$

$$z_i = u \cdot m_i$$

Herein, pi is the weight matrix representing a degree of the relevance between the first sentence embedding and the question sentence embedding, u is the question sentence embedding, mi is the first sentence embedding, i is identification information of the first sentence embedding, k is the total number of elements input to a softmax function, and "·" denotes matrix multiplication.

5. The voice conversation method according to claim 1, wherein the output information o in step (f) is a weighted sum of the weight matrix and the second sentence embedding and is calculated according to Equation 6, $$o = \sum_i p_i c_i \qquad \text{[Equation 6]}$$

Herein, pi is the weight matrix representing a degree of the relevance between the first sentence embedding and the question sentence embedding, and ci is the second sentence embedding.

6. The voice conversation method according to claim 1, wherein, in the step (g), a probability that each of the candidate answer sentences is a correct answer is calculated on the basis of the prediction information according to Equation 7, a sentence having the highest probability is predicted as an answer sentence, and the answer sentence is output, $$a = \text{softmax}(W(o+u)) \qquad \text{[Equation 7]}$$

Herein, in Equation (7), a dimension of the "a" is equal to the number of global candidates and represents a probability value for each of the plurality of sentence candidates, and W is a parameter matrix.

7. A non-transitory computer-readable memory storing instructions for executing operations by a processor for implementing a voice conversation method, the instructions for executing the voice conversation method executed on the processor cause the processor to execute steps of:

(a) receiving, as an input, a query response corpus including history sentences, candidate answer sentences, and a question sentence;

(b) generating a first word vector for the history sentences included in the query response corpus by using a first embedding vector and performing bi-directional LSTM processing on the first word vector to generate first sentence embedding for each history sentence;

(c) generating a second word vector for each of the history sentences included in the query response corpus by using a second embedding vector and performing bi-directional LSTM processing on the second word vector to generate second sentence embedding for each history sentence;

(d) generating a third word vector for the question sentence included in the query response corpus by using a third embedding vector and performing bi-directional LSTM processing on the third word vector to generate question sentence embedding;

(e) inputting the first sentence embedding and the question sentence embedding into an input memory of a memory network and inputting the second sentence embedding into an output memory of the memory network;

(f) generating a weight matrix representing relevance between the first sentence embedding of the input memory and the question sentence embedding, generating output information by performing weighted sum for the weight matrix and the second sentence embedding of the output memory, adding the output information and the question sentence embedding to obtain prediction information, and outputting the prediction information; and (g) predicting an answer sentence for the question sentence by using the prediction information and outputting the answer sentence.

8. The non-transitory computer-readable memory according to claim 7, wherein the step (a) includes a step of performing pre-processing on sentences included in the input query response corpus to generate a word sequence including metadata converted from words, wherein, in the step (b), the first word vector is generated by multiplying each of the words constituting the word sequence for the history sentence by the first embedding vector, wherein, in the step (c), the second word vector is generated by multiplying each of the words constituting the word sequence for the history sentence by the second embedding vector, and wherein, in the step (d), the third word vector is generated by multiplying each of the words constituting the word sequence for the question sentence by the third embedding vector.

9. The non-transitory computer-readable memory according to claim 8, wherein, in the step (a), a database representing the words included in the query response corpus by a metadata is input together with the query response corpus, wherein the metadata is configured with a data type and an identification number for each word constituting the sentences included in the query response corpus.

* * * * *